United States Patent [19]
Steingroever

[11] 3,925,724
[45] Dec. 9, 1975

[54] APPARATUS FOR MEASURING THE HYSTERESIS CURVE OF MAGNETIC BODIES USING A MAGNETIC POTENTIAL COIL

[75] Inventor: Erich Steingroever, Bonn, Germany

[73] Assignee: Elektro-Physik, Hans Nix & Dr. Ing. E. Steingroever, KG, Cologne, Germany

[22] Filed: Nov. 9, 1973

[21] Appl. No.: 414,324

[30] Foreign Application Priority Data
June 6, 1973  Germany............................ 2328690

[52] U.S. Cl............................................... 324/34 R
[51] Int. Cl.$^2$........................................ G01R 33/00
[58] Field of Search............. 324/43 R, 47, 40, 34 R

[56] References Cited
UNITED STATES PATENTS

| | | | |
|---|---|---|---|
| 1,204,489 | 11/1916 | Rogowski............................ | 324/34 R |
| 2,861,241 | 11/1958 | Leonard et al. ........................ | 324/40 |
| 3,365,660 | 1/1968 | Steingroever ........................ | 324/34 R |
| R19,600 | 6/1935 | Hermann ................................ | 324/40 |

FOREIGN PATENTS OR APPLICATIONS

| | | | |
|---|---|---|---|
| 1,104,777 | 11/1955 | France................................. | 324/34 R |

OTHER PUBLICATIONS
Margerison et al., Some Uses of the Magnetic Potentiometer etc., Jour. Of Scie. Inst., Aug. 1946, pp. 182–184.

Magnetik, Elektro–Physik Publication, 1972, pp. 14,15,19 and 20.

Primary Examiner—Robert J. Corcoran

[57] ABSTRACT

Apparatus for measuring the internal field intensity H of a magnetic body having opposite poles surfaces includes an elongated magnetic potential measuring coil, one end of which is placed in contact with one of the pole surfaces of the body being measured, while the body is subjected to a magnetic field of variable intensity having lines of force passing through the body in directions perpendicular to the pole surfaces of the body being measured, the other end of the measuring coil being placed at a location which is uninfluenced by the magnetic potential at either of the poles of the body in one example and, in another example, being placed in contact with the other pole surface of the body. The variable magnetic field may be generated by an adjustable magnetic measuring yoke within whose soft iron pole pieces portions of the measuring coil are embedded, or the field may be generated by an iron-free coil which completely surrounds the body being measured. Values for B may also be measured by a second coil at the same time.

8 Claims, 7 Drawing Figures

APPARATUS FOR MEASURING THE HYSTERESIS CURVE OF MAGNETIC BODIES USING A MAGNETIC POTENTIAL COIL

The present invention relates to apparatus for the measurement of magnetic characteristics of materials and more particularly to the measurement of the hysteresis curves of magnetic materials, including the obtaining of accurate values of internal field strength H.

As is well known, the magnetic properties of materials are represented by the hysteresis curve, which is also called the curve of magnetization. This curve shows values of induction B, or magnetization B–H, as a function of field strength H in the magnetic material.

Measurement of induction B has been obtained in the past, either by using a coil encircling the sample body, or by means of a coil completely embedded in one of the soft iron pole pieces of an electromagnetic measuring yoke. such an arrangement is described in a paper entitled "Some Measurements of Inhomogeneous Permanent Magnets by the Pole-Coil Method" by E. Steingroever, published in Special Technical Publication 526 of American Society for Testing and Materials, pages 43–47 (1973).

However, up to this point it has not been possible to measure the field strength H inside the sample body. It has been customary to make a measurement of H adjacent the sample and make an assumption that the internal value is the same as the measured value, or to obtain a value by extrapolation such as described in the German Industrial Standard published as DIN 50 470, 1964, Section 8.3. These assumptions are inexact, particularly in the case of highly magnetically coercive materials, or if the induction is sufficiently high that there is magnetic saturation of the soft iron poles of the measuring yoke.

Therefore, one object of the present invention is to provide apparatus which is capable of directly measuring the internal magnetic field strength H of a magnetic body while it is subjected to the magnetic field generated between the two pole pieces of a conventional measuring yoke.

This is accomplished by utilizing an elongated potential coil which extends through at least one of the pole pieces of the measuring yoke, with one end of the potential coil being in contact with one face of the sample body being measured in the yoke, the other end of the potential coil being disposed at a remote location at which the magnetic potential is substantially constant; what otherwise might be called a "field-free" space.

Figure 1:
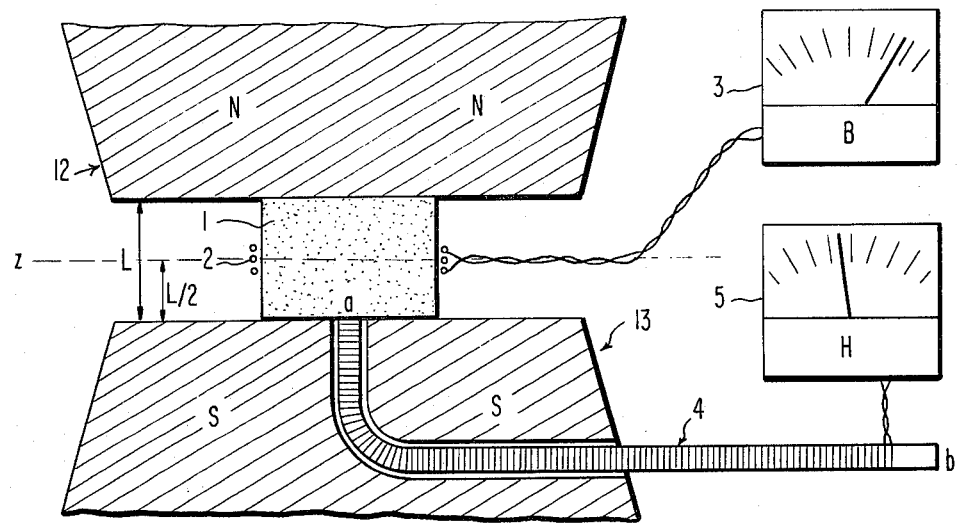
FIG. 1 is a cross-section taken through the two pole pieces of an electromagnetic measuring yoke having a preferred form of apparatus installed therein for the measurement of the internal field strength H of magnetic bodies in accordance with the teachings of this invention.
Figure 2:
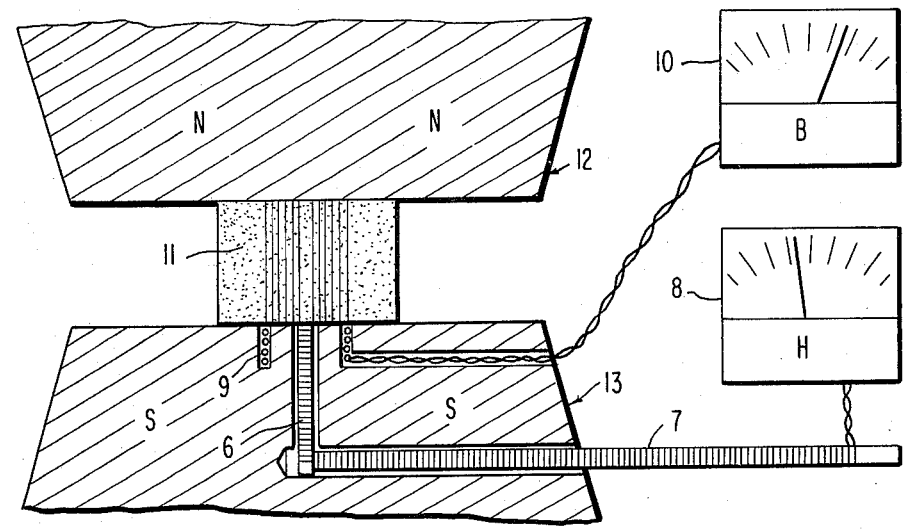
FIG. 2 illustrates a modified form of the invention.
Figure 3:
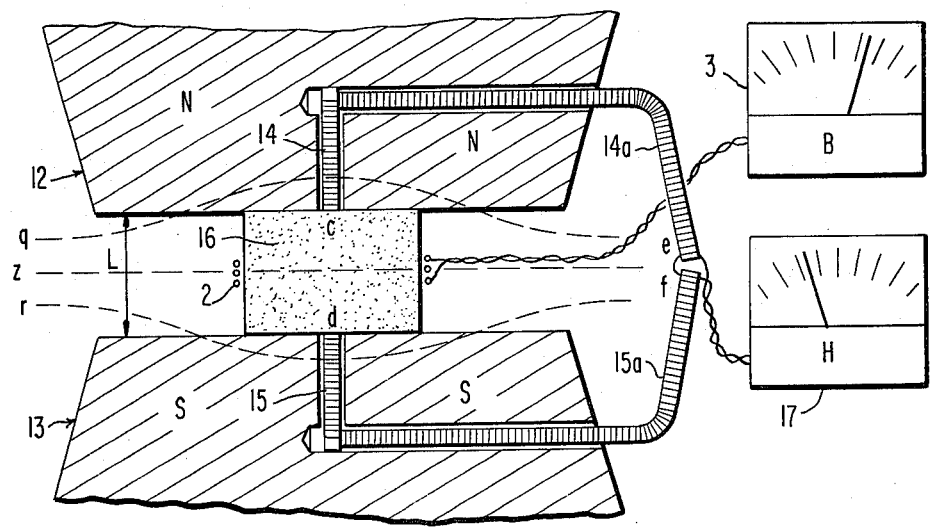
FIG. 3 is still another form of the invention.

In FIGS. 1, 2 and 3, the numerals 12 and 13 designate the respective soft iron pole pieces of an electromagnetic yoke designed for testing the characteristics of magnetic bodies. The respective pole pieces are energized by a pair of coils (not shown) connected together and supplied from a source of D.C. current which can be regulated to vary the magnetic induction in the poles 12 and 13 and, in addition, at least one of the poles can be counted for movement toward and away from the other pole to accommodate magnetic bodies of varying sizes. Magnetic yokes of this type are well known and one commercially available is manufactured by Elektro-Physik Hans Nix and Dr.-Ing. E. Steingroever KG. of Cologne, West Germany.

In FIG. 1, a magnetic sample which is to be measured is indicated by numeral 1, positioned between, in contact with, the two pole pieces 12 and 13 of a magnetic measuring yoke. The induction B in the sample can be measured by means of a coil 2 which closely encircles the sample body and is connected to a fluxmeter 3. The internal field strength H in sample 1 is measured by means of the potential pole coil 4 which passes through a suitable internal passage in pole piece 13 so that one end $a$ of the coil is placed in contact with one surface of the sample body, while the other end $b$ of the coil extends outwardly from the side of the pole piece and at a location sufficiently remote such that the magnetic field at that point is, for all practical purposes, zero. The end $b$ may also be situated in the magnetic field, if it is located in the plane $z$, which passes through the middle of the sample where the magnetic potential is constant, or neutral. The coil 4 is also connected to another fluxmeter 5.

The potential coil 4 is essentially an elongated coil having a constant value of $n \cdot F/l$, wherein $n$ is the number of turns of winding, $F$ is the cross-sectional area of the winding and $l$ is the length of the coil. Thus it is a coil having constant winding area density and may be formed on an elongated rod having a uniform cross-section with constant density of winding $n \cdot F/l$. If a coil of this type is connected to a magnetic fluxmeter, the fluxmeter provides immediate indication of the changes in differences between the magnetic potentials at the opposite ends of the potential coil. Also, if one end of the coil is maintained at a location where the magnetic potential is constant, such as in the neutral zone $z$, the fluxmeter will record any change in magnetic potential at the other end of the coil.

Thus, the fluxmeter 5 provides a measurement of the difference in magnetic potential at points $a$ and $b$, which is proportional to the product of internal field strength H and one half the length $(L/2)$ of the sample body. The desired value of H is readily obtained by dividing the measured potential difference $H \cdot L/2$ by $L/2$; this can be realized by adjusting the sensitivity of fluxmeter 5 accordingly to the length $L$ of the sample.

In FIG. 2 there is shown a modification of the invention in which the potential coil consists of two sections 6 and 7 connected in series with each other and with a fluxmeter 8. The two partial coils 6 and 7 have the same overall characteristics as the single coil 4 of FIG. 1 but, as a practical matter, it is more feasible to drill two intersecting passages in pole piece 13 than to drill a curved passage as in FIG. 1. However, the internal field strength H is measured in the same way with the two coils 6 and 7 as with the single coil 4.

In addition, pole piece 13 of FIG. 2 is also provided with an annular recess which contains another coil 9, connected to another fluxmeter 10 for measuring the induction B in a known manner. Coil 9 accepts part of the magnetic flux through the surface of the sample 11 which is under test, so that sample bodies of any size can be measured without the necessity for determining their cross-sections, as is the case with the arrangement of FIG. 1. The B-coil may also be situated in the opposite pole 12.

The arrangement shown in FIG. 3 is particularly useful in the measurement of magnetic bodies in which the magnetic values are heterogeneously distributed through the body. In this case both of the pole pieces 12 and 13 of the measuring yoke are provided with intersecting passages to respectively accommodate two-part potential coils 14 and 14a, 15 and 15a, each of which is generally similar to the previous two-part coils 6 and 7. The respective ends c and d of the coils are positioned in contact with the two end surfaces of the sample 16 which is to be measured, while the respective remote ends e and f are positioned in close proximity to each other in so-called "field-free" space or in the neutral zone z The two coils are connected in series and with a fluxmeter 17 whose sensitivity is adjusted with respect to the length L of the sample so that the average value of the inner field strength H of the sample can be immediately indicated regardless of magnetic inhomogeneity or irregular shape of sample 16. For example, the sample could be conical in shape.

In FIG. 3 there is also shown the results produced when sample bodies having high saturation magnetization and/or high coercive field strength are measured. There will be magnetic saturation of the soft iron pole pieces 12 and 13 in the region of the sample, so that the surfaces of the poles of the measuring yoke are no longer equipotential surfaces, but rather have the characteristics indicated by the broken lines q and r. The result is, that the magnetic field strength, which is reciprocal to the distance between the equipotential lines q and r, in the region adjacent the sample is not the same as the actual internal field strength H and it is not possible to measure in the usual way and draw conclusions as to the internal field strength H from the field strength measured next to the sample. However, by using one, or both of the potential coils of this invention, it is possible to measure the field strength H actually prevailing with the sample. Measurement of the induction B can also be made with the coil 2 connected to fluxmeter 3; as in the modification shown in FIG. 1.

One advantage of the present invention lies in the fact that the possible errors which may arise from the presence of a passage for accommodating a potential coil in the pole piece of the measuring yoke can be kept to an absolute minimum. With a corresponding sensitivity of the fluxmeter, the potential coil can have a diameter of as little as only 1.00mm, so that in the case of a sample having a diameter of about 10.00mm, there is practically no noticeable disturbance of the flux through the sample. As an example; a preferred form of potential coil 6 useful in practicing this invention may consist of several layers of copper wire, having a diameter of 0.04mm, wound, with a uniform winding area density $n \cdot F/l$, on a non-magnetic core, such as brass, having a uniform cross-sectional diameter of 1.00mm, while the coil 7 may consist of thicker wire wound on a thicker core to reduce the electrical resistance, so long as it has the same winding area density $n \cdot F/l$ as coil 6.

Figure 4:
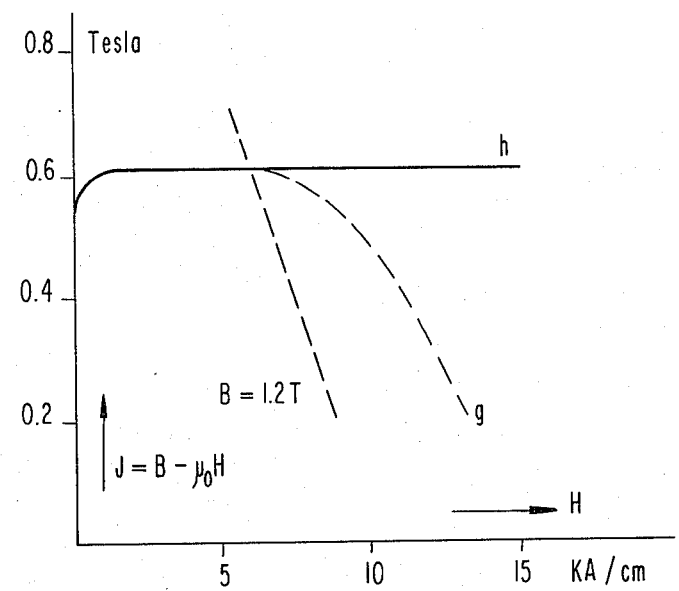
FIG. 4 is a diagram of the J(H) curve obtained with a magnet body of pure nickel.

In the prior art it is known to embed two coils in one of the pole pieces of the measuring yoke. One of the coils is in contact with the end surface of the sample body and the other coil is in the air gap adjacent the sample. The two coils are connected in series for measuring magnetization $B-H=J$. FIG. 4 illustrates the results obtained when the values of J are plotted against H for a sample composed of pure nickel. The curve shown by broken line g designates the values obtained by measurements according to the above described prior system and from this it can be seen that as soon as the induction in the poles of the measuring yoke exceeds a value of about 1.2 tesla (12 kilogauss), the H coil measures a field strength that is excessive, so that $J=B-H$ becomes less than the saturation magnetization already obtained at lower values of induction.

However, when the potential coil of the present invention is employed the curve h is obtained from which the true saturation magnetization of the sample up to $H=15KA/cm$ can be learned.

The invention is of special significance for the measurement of highly coercive magnetic materials, for example Alnico alloys, barium-strotium-ferrites and rare earth-cobalt alloys.

Figure 5:
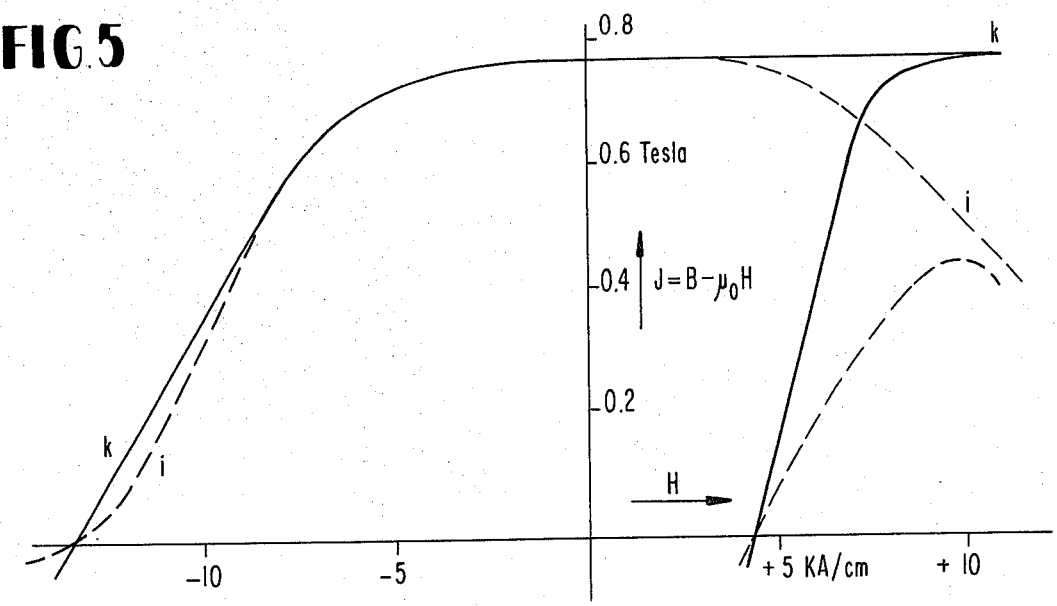
FIG. 5 is a similar diagram obtained with a sample of samarium cobalt.

In FIG. 5 there is shown a graph of the magnetization curves wherein $J=B-\mu_o H$ is plotted against H for a sample body composed of samarium-cobalt ($SmCo_5$) alloy.

If the magnetic field strength is measured by the prior art method described above the curve indicated by broken line i is obtained, having the same errors as described in connection with curve g of FIG. 4. On the other hand, if the values for H are obtained by using the potential coil of the present invention the correct values of J will be obtained, as shown by the solid line curve k.

While the employment of a measuring yoke having iron pole pieces is quite satisfactory for the production of field intensities of normal values but these yokes are impractical when it is desired to produce field intensities in excess of 30KA/cm. Therefore, FIG. 6 discloses a further example of the invention by means of which measurements of internal field H can be made with much greater external field intensities in excess of 100KA/cm and more.

Figure 6:
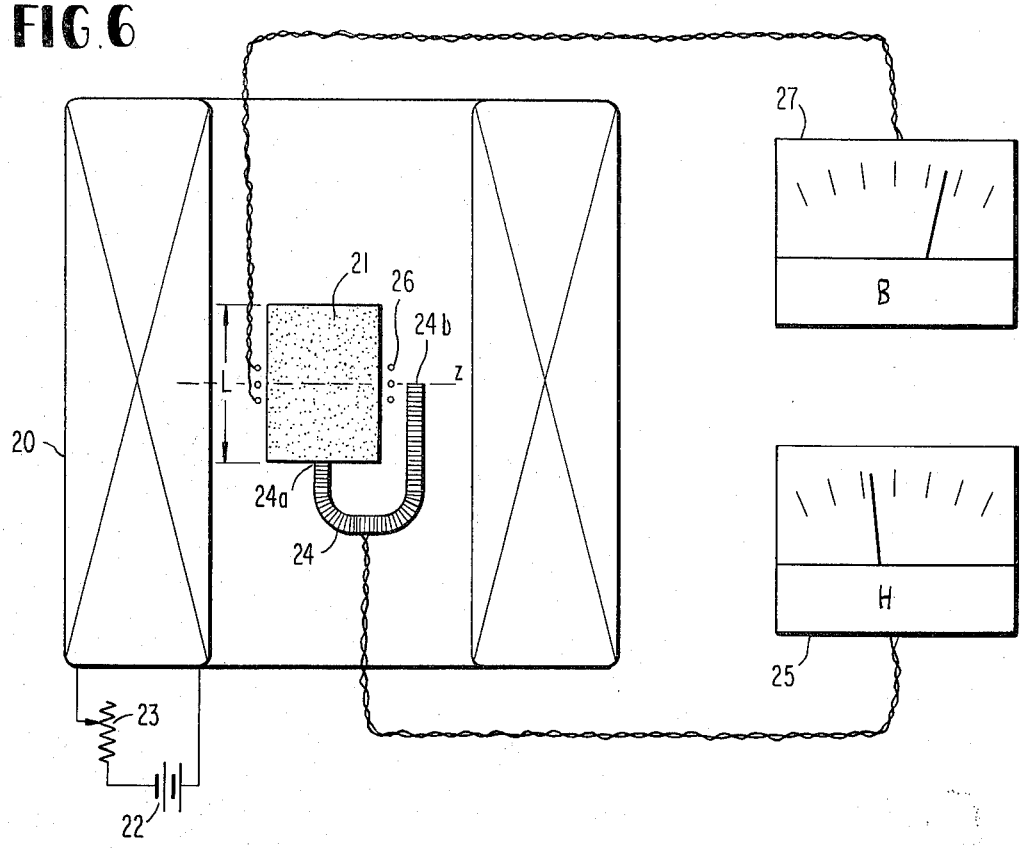
FIG. 6 is a further modification of the invention using an open coil for generating the magnetic field.

In FIG. 6 the apparatus consists of a cylindrical coreless coil 20 which completely surrounds the sample body 21 of magnetic material and extends at both ends beyond the planes of the opposing parallel pole surfaces of the sample. Coil 20 may be of the superconducting cryogenic type and may be energized from a D.C. source, such as the battery 22, under the control of a variable resistance 23. The sample 21 is positioned in the center of the coil 20 so as to be located in the homogeneous field of the coil, with the lines of force passing through in a direction perpendicular to the opposing pole surfaces.

In this instance, a generally J-shaped potential coil 24, which is similar in construction to the potential coils just described, is disposed with one end 24a, in contact with one pole surface of the sample body while the other end 24b is disposed at a remote location, such as in the plane of the neutral zone z of the body having a constant magnetic potential with respect to the sample body. As in the previous examples, the potential coil 24 may be connected with fluxmeter 25. By calibrating the fluxmeter reciprocally to one half the length (L/2) of the sample body, direct readings of the values of the internal field H can be obtained. In addition, the induction B may also be measured in a known way by means of a coil 26 which encircles the body 21 and is connected to fluxmeter 27.

Figure 7:
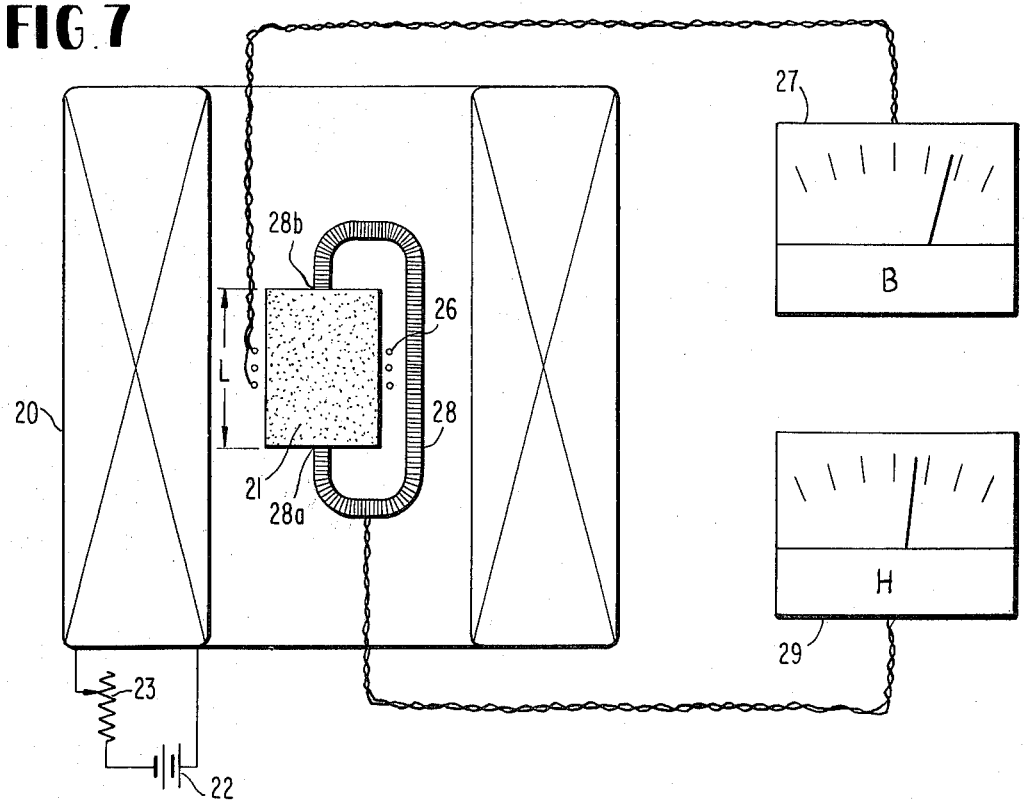
FIG. 7 is still another form of the invention.

The modification shown in FIG. 7 also discloses a system in which the coil 20 is used to generate a high intensity external field for testing a sample body 21. In this case, the potential coil 28 may be generally C-shaped, so that one end 28a is in contact with one pole surface of the sample body and the other remote end 28b, is in contact with the other pole surface. Potential coil 28 is connected with fluxmeter 29 but, in this case it is calibrated reciprocally to the full length L of the sample body. As before, the induction B can be measured by means of the encircling coil 26 connected to a fluxmeter 27.

The potential coil of the present invention can be used in the measurement of both the so-called "hard" and "soft" magnetic materials and is also useful for the measurement of the saturation magnetization or coercive field strength of materials.

I claim:

1. In apparatus for measuring the internal field intensity $H$ of a sample body of magnetic material having opposite pole surfaces extending in parallel planes by subjecting a sample body to a magnetic field of variable intensity having lines of force passing through said sample body in directions perpendicular to said parallel planes, the improvement which comprises an elongated magnetic potential measuring coil means having a nonmagnetic core and a uniform winding area density along its length, one end of said measuring coil means being disposed in contact with one of the pole surfaces of said body, while being subjected to said magnetic field; the other end of the measuring coil means being disposed in a zone having a neutral magnetic potential with respect to the opposite pole surfaces of the sample body, and a fluxmeter connected with said coil means, means for generating a magnetic field of variable intensity comprising an adjustable magnetic measuring yoke provided with a pair of opposing soft iron pole pieces for contact with the respective opposite pole surfaces of said sample body, said one end of the measuring coil means being embedded in one of said soft iron pole pieces, the other end of the measuring coil means extending exteriorly of said pole piece.

2. The invention defined in claim 1, wherein said measuring coil means comprises first and second elongated coils connected with each other in series, one end of the first coil being in contact with the pole surface of a sample body, one end of the second coil being disposed exteriorly of the pole piece, and the respective other ends of the first and second coils being adjacent to each other.

3. The invention defined in claim 2, wherein said first and second coils are disposed in respective intersecting passages provided in said soft iron pole piece.

4. In apparatus for measuring the internal field intensity H of a sample body of magnetic material having opposite pole surfaces extending in parallel planes by subjecting a sample body to a magnetic field of variable intensity having lines of force passing through said sample body in directions perpendicular to said parallel planes, the improvement which comprises an elongated magnetic potential measuring coil means having a nonmagnetic core and a uniform winding area density along its length, one end of said measuring coil means being disposed in contact with one of the pole surfaces of said body, while being subjected to said magnetic field; the other end of the measuring coil means being disposed in contact with the other of the pole surfaces of said body while being subjected to said magnetic field, and a fluxmeter connected with said measuring coil means, means for generating said magnetic field of variable intensity comprising an adjustable magnetic measuring yoke provided with a pair of opposing soft iron pole pieces for contact with the respective opposite pole surfaces of said sample body, each of said soft iron pole pieces having the respective opposite ends of said measuring coil means embedded therein, a portion of said measuring coil means extending exteriorly of said pole pieces.

5. The invention defined in claim 4, wherein said measuring coil means comprises first and second elongated coils connected with each other in series for each one of said pair of soft iron pole pieces, one end of the first coil for each pole piece being in contact with a respective pole surface of a sample body, one end of the second coil for each pole piece being disposed exteriorly of the pole piece, and the other ends of the respective first and second coils for each pole piece being adjacent to each other.

6. The invention defined in claim 5, wherein the respective first and second coils for each of said pair of soft iron pole pieces are disposed in respective intersecting passages provided in each of said pole pieces.

7. The invention defined in claim 5, wherein the respective one ends of each of said second coils are disposed adjacent to each other.

8. The invention defined in claim 5, wherein the respective one ends of each of said second coils are disposed in a plane having a neutral magnetic potential with respect to the opposite pole surfaces of the sample body.

* * * * *